W. F. LITTLE AND C. H. SHARP.
PHOTOMETER.
APPLICATION FILED JULY 19, 1917.
1,396,963.
Patented Nov. 15, 1921.
3 SHEETS—SHEET 1.
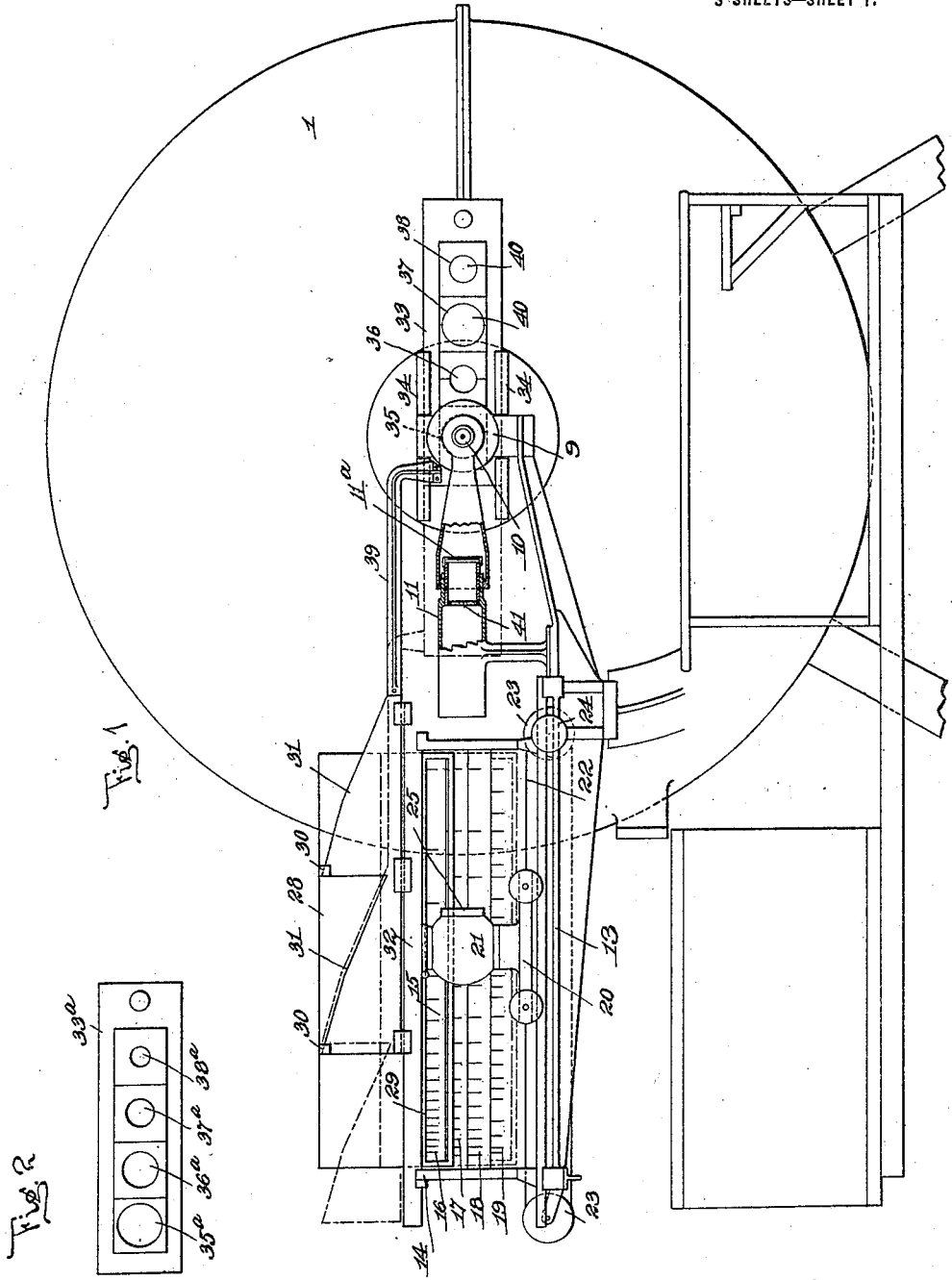
Witnesses:
Inventors
William F. Little
Clayton H. Sharp
By Dyer & Taylor
Attorneys.

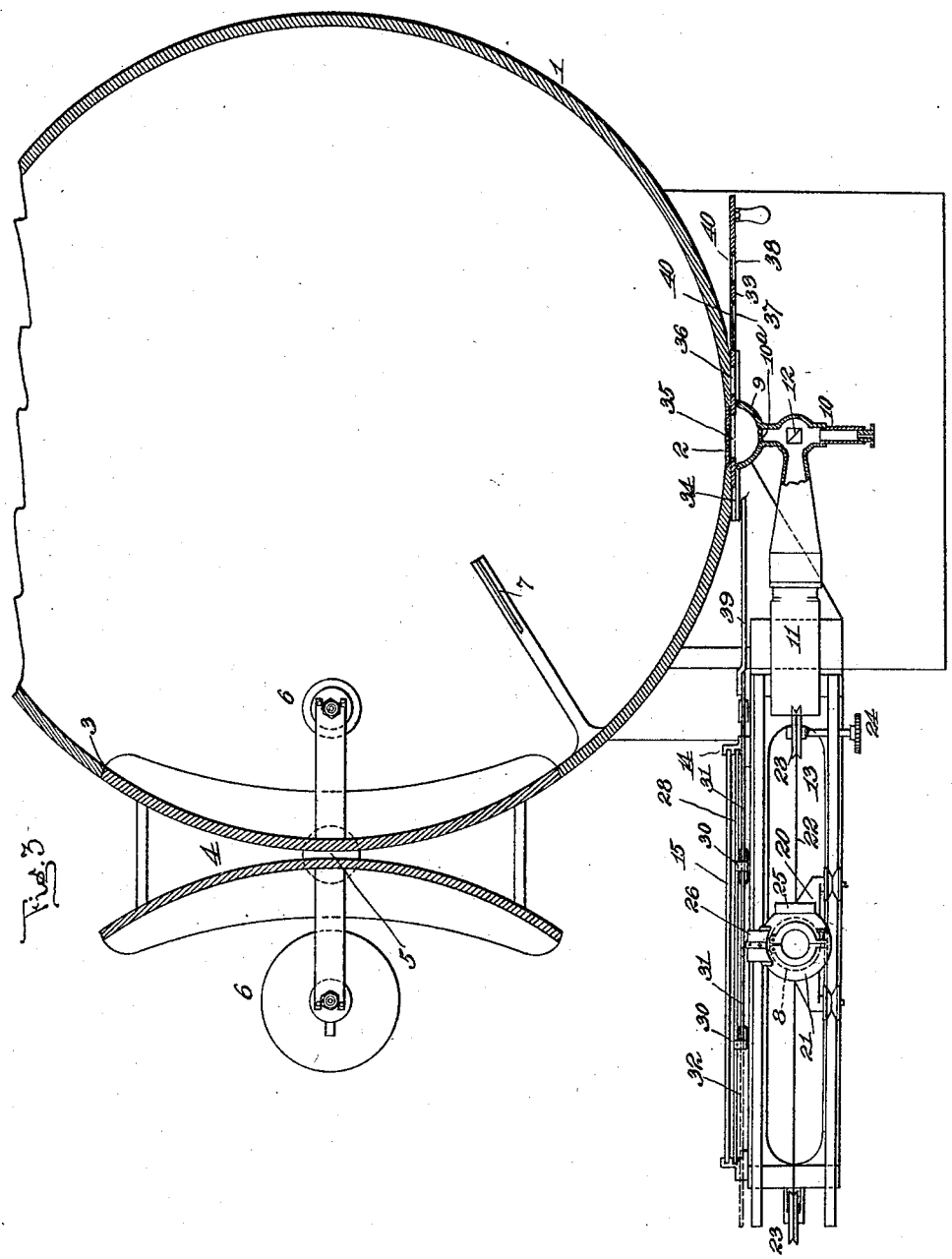

W. F. LITTLE AND C. H. SHARP.
PHOTOMETER.
APPLICATION FILED JULY 19, 1917.
1,396,963.
Patented Nov. 15, 1921.
3 SHEETS—SHEET 3.
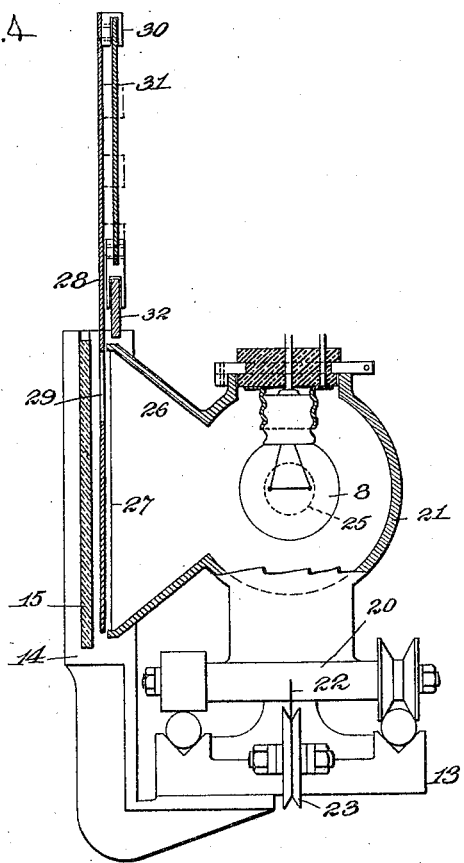
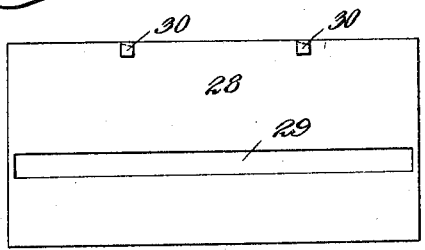

UNITED STATES PATENT OFFICE.

WILLIAM F. LITTLE, OF YONKERS, AND CLAYTON H. SHARP, OF WHITE PLAINS, NEW YORK.

PHOTOMETER.

1,396,963.   Specification of Letters Patent.   Patented Nov. 15, 1921.

Application filed July 19, 1917. Serial No. 181,530.

*To all whom it may concern:*

Be it known that we, WILLIAM F. LITTLE, a citizen of the United States, residing at Yonkers, county of Westchester, State of New York, and CLAYTON H. SHARP, a citizen of the United States, residing at White Plains, county of Westchester, and State of New York, have invented a new and useful Improvement in Photometers, of which the following is a specification.

This invention relates to photometers for testing the candle power or luminous flux of sources of light. The invention may be applied to various forms of photometers, as the spherical photometer, the so-called daylight photometer or photometers of other form.

The object of the invention is to increase the speed convenience and accuracy of operation to the end that a greater number of lamps may be inspected in a given time.

Another object is to increase the range of the device whereby lamps of various character as to color, intensity and size may be tested without changing the comparison lamp.

These and further objects will more fully appear in the following specification and accompanying drawings considered together or separately.

One embodiment of the invention is illustrated in the accompanying drawings in which like parts in all of the several figures are designated by similar reference characters, and in which—

Figure 1 is a side elevation partly in section of a spherical photometer provided with our invention.

Fig. 2 is a detail side elevation of a modified form of observation slide.

Fig. 3 is a plan view partly in horizontal section of the device shown in Fig. 1.

Fig. 4 is a detail end elevation partly in section of a portion of the device on an enlarged scale, the section being taken on the line indicated at 4—4 on Fig. 3, and Fig. 5 is a side view of the preferred form scale screen.

In the embodiment of the invention illustrated 1 designates a hollow spherical integrating body into which the lamps to be tested are placed and lighted. The test lamps are introduced into the sphere through an opening 3 and are supported at the proper point. A double door 4 swinging on a vertical pivot 5 closes the opening 3 and a test lamp 6 is carried on each side of the door so that while one lamp is being tested the lamp previously tested on the other side of the door is removed and a new lamp substituted. While the lamp inside of the integrating body is being tested the one on the outside of the door may be lighted so that when it in turn is placed in the body it will be heated and at normal efficiency. The illumination of the interior of the sphere will fall on a sheet of translucent glass in a window 2 in the side of the sphere.

The illumination of the sphere is compared with that of a comparison lamp 8 of known candle power, and the candle power of the test lamp is indicated by the position of the comparison lamp relatively to a translucent glass $11^a$ on which its light falls.

Inclosing the window 2 is a hemispherical chamber 9 and carried by the casing of the chamber and in line with the center of the window is an eye piece 10 through which a translucent glass $10^a$ between the eye piece 10 and window 2 may be observed.

A tube 11 perpendicular to the tube of the eye piece communicates with the eyepiece and within the tube 11 is a translucent glass $11^a$ on which the illumination of the comparison lamp will fall. A mirror or other optical device 12 is placed in the eyepiece tube in alinement with the tube 11. The mirror is so positioned that the observer may look to one side thereof and directly at the glass $10^a$ and at the same time the light on the glass $11^a$ will be reflected to his eye by the mirror.

A bed frame 13 extends parallel to the tube 11 and carries a frame 14 in which is carried a translucent plate 15 having thereon a plurality of scales 16, 17, 18 and 19 arranged in parallel rows. Mounted on the bed frame is a carriage 20 provided with a hood 21 within which is placed the comparison lamp. The carriage is moved along the bed frame by means of a cord or cable 22 passing over a pulley 23 at each end of the bed frame. A hand wheel 24 is carried on the shaft of one of the pulleys to facilitate the manipulation of the device.

The hood 21 is provided with an opening 25 in axial alinement with the photometer tube 11 and mirror 12 in order that the light from the comparison lamp 8 may be directed to the eye of the observer. At right angles to the opening 25 the hood is provided with an open ended extension 26. The walls of the extension extend to close proximity to the scale plate 15 and a wire or other filamentous member 27 is stretched vertically across the center of the opening and the shadow of the filament will, when the comparison lamp is lighted, indicate the position of the center of the lamp to an observer on the opposite side of the scale plate.

In the embodiment of the invention illustrated we have shown four parallel scales 16, 17, 18 and 19 on the scale screen whereby the capacity of the device is quadrupled without increasing the length of the apparatus or the travel of the comparison lamp. In order to avoid confusion in reading from the scales we provide a vertically movable scale screen 28 having an aperture 29 through which but one scale may be viewed. The upper edge of the screen 28 is provided with hooks or other supporting members 30 which rest upon a pair of inclined cams 31—31. The lower edge of the cams is provided with shoes which engage the upper edge of a rail 32 supported upon the bed frame.

In connection with the cams 31 we employ an eye piece screen 33 which is movable in guides 34 across the window 2. The screen 33 is provided with a plurality of stop openings 35, 36, 37 and 38 corresponding in number with the scales on the plate or screen 15. The openings stop off the light issuing from the window 2 to a greater or less extent and the amount of light permitted to pass through any stop opening is proportioned to one of the scales on the scale plate. The scale 16 is calibrated for the amount of light transmitted through the opening 35; scale 17 to 36; scale 18 with 37 and scale 19 with 38. The screen 33 is connected to the cams 31 by means of a bar 39 so that any longitudinal movement of the screen 33 will be communicated to the cam 31 and the screen 28 will be raised or lowered so that the scale corresponding to the stop opening in line with the eye piece is disclosed.

In order to avoid changing the comparison lamp when lamps of different character and giving light of a greater or less degree of whiteness are being tested we prefer to cover the stop openings 37 and 38 with color screens 40 so that the light transmitted from the sphere to the eye piece may be brought to the same color as that of the comparison lamp. For example, if the comparison lamp be a tungsten lamp and the lamps to be tested be large and small vacuum tungsten lamps and large and small gas filled tungsten lamps the stop screen 33 shown in Figs. 1 and 3 will be employed and the openings 37 and 38 will be covered by glass of a yellow tint sufficient to bring the white light of the gas lamp to the yellowish tint of the light of the tungsten comparison lamp. When a gas filled lamp of small size is placed within the sphere the operator at the eye piece will move the screen 33 until the opening 37 is in line with the eye piece. The movement of the screen will move the cams to the left in Fig. 1 and the scale screen 28 will be lowered thereby covering the scales 16 and 17 and disclosing the scale 18. The operator at the eye piece will now manipulate the hand wheel 24 and move the comparison lamp toward or away from the diffusing glass 11$^a$ until the brightness of the glass as seen in the mirror becomes exactly the same as the brightness of the glass 10$^a$. The operator at the door of the sphere will note the position of the shadow of the wire 27 on the scale 18 and the reading will give the candle power of the test lamp. When a larger gas filled lamp is to be tested the stop 38 will be moved into position.

When a vacuum tungsten lamp is to be tested one of the open stops is moved in position as depends upon whether the test lamp is large or small and either the scale 16 or 17 is disclosed. The hand wheel is operated and the reading is taken as before.

If a larger variety of sizes of lamps of the same character are to be tested the slide 33$^a$ shown in Fig. 2 may be employed. In this slide the stop openings 35$^a$, 36$^a$, 37$^a$ and 38$^a$ are not provided with color screens and if the lamps to be tested are of the same character as that of the comparison lamp the unchanged lights of the two lamps are compared. If, however, the test lamps differ in character from the comparison lamp a color filter may be inserted at 41 in the photometer tube. This color filter will be bluish if the test lamps give a whiter light than the comparison lamp and yellowish if the latter lamp is whiter.

It will be seen that many combinations as to color screens and sizes of stop openings may be made. If extra large lamps are to be tested a slide having small stop openings may be employed in conjunction with properly calibrated scales or the amount of light transmitted to the eye piece from the sphere may be stopped down by the density of the color screens, or white screens of different densities may be employed to stop the light down.

It will be understood that instead of the scale screen being on the same side of the scale plate as is the comparison lamp, it may be on the opposite side of the scale plate.

Instead of reading the scales from the side of the plate opposite the comparison lamp they may be read from the same side in which case a finger or pointer may be carried by the lamp hood at one side thereof and the scales properly positioned relatively to it.

Instead of having the sight opening in the scale screen near the bottom thereof as shown in Fig. 1 we prefer to use the screen in Fig. 5, to completely cover all but one of the scales at all times.

In accordance with the provisions of the patent statutes we have described the principle of our invention, together with the apparatus which we now consider to represent the best embodiment thereof, but we desire to have it understood that the apparatus shown is merely illustrative, and that the invention may be carried out in other ways.

Having thus described our invention what we now claim as new and desire to secure by Letters Patent, is:

1. A photometer having a comparison light, a lamp to be tested, a plurality of scales to indicate light value, means for controlling the intensity of the observed light of the test lamp, and means for indicating the scale on which the light value is indicated.

2. A photometer having a comparison lamp, a lamp to be tested, a stationary comparator for simultaneously viewing the light from both sources, and means for controlling the observed intensity of the comparison lamp and of the light of the test lamp.

3. A photometer having a comparison lamp, a test lamp, means for simultaneously viewing light from both sources, a screen having a plurality of different sized light openings for controlling the intensity of the observed light of the test lamp, and means for simultaneously controlling the color of the light.

4. A photometer having a comparison lamp, a test lamp, means for simultaneously viewing the light from both sources, and a screen having a plurality of different sized light openings and provided with means for simultaneously controlling the intensity and color of the lights.

5. A photometer having a comparison lamp, a test lamp, means for simultaneously viewing the light from both sources, a plurality of scales to indicate light values, means for controlling the intensity of the observed light of the test lamp, and means for automatically indicating the scale on which the light value is indicated.

6. A photometer having a comparison lamp, a test lamp, means for simultaneously viewing the light from both sources, a plurality of scales to indicate light values, means for controlling the color of the light, and means for automatically indicating the scale on which the light value is indicated.

7. A photometer having a comparison lamp, a test lamp, means for simultaneously viewing the light from both sources, a plurality of scales to indicate light values, means for simultaneously controlling the intensity and color of the observed light of the test lamps and for automatically indicating the scale on which the light value is indicated.

8. A photometer having a comparison lamp, a test lamp, an eye piece for simultaneously viewing the light from both sources, a plurality of scales to indicate light values, a screen between the eye piece and the test lamp, said screen being provided with light openings corresponding in number with the scales, and means whereby movement of the screen will automatically disclose the scale corresponding to the light opening opposite the eye piece.

9. A photometer having a comparison lamp, a test lamp, an eye piece for simultaneously viewing the light from both sources, a plurality of scales to indicate light values, a screen between the eye piece and the test lamp, said screen being provided with light openings corresponding in number with the scales, color filters in the openings, and means whereby movement of the screen will automatically disclose the scale corresponding to the light opening opposite the eye piece.

10. A photometer having a comparison lamp, a test lamp, an eye piece for simultaneously viewing the light from both sources, a plurality of scales to indicate light values, a screen between the eye piece and the test lamp, said screen being provided with light openings corresponding in number with the scales, a cam carried by the screen, a shutter carried by the cam, there being an opening in the shutter whereby movement of the screen will operate the shutter to disclose the scale corresponding to the light opening opposite the eye piece.

11. A photometer having a light integrator, a test lamp within the integrator, a translucent window in the wall of the integrator, a hemispherical chamber inclosing the window, a translucent glass in the chamber, an eye piece through which the light of the test lamp on the glass may be viewed, a comparison lamp movable toward and away from the eye piece, a diffusing glass between the comparison lamp and the eye piece, means for viewing the light of the comparison lamp on the diffusing glass through the eye piece, a translucent plate carrying a plurality of scales to indicate different light values, means whereby the comparison lamp will illuminate the scales, a slide movable relatively to the window and between the same and the eye piece, said slide having means for varying the color and intensity of the light of the test lamp, a cam carried by the slide, a screen carried by and movable relatively to the cam, said screen being located between the comparison lamp and the plate, there being an opening in the screen for disclosing a single scale whereby movement of the slide will automatically operate the screen so that the comparison lamp will illuminate the scale corresponding to the opening opposite the eye piece, there being means carried by the comparison lamp for indicating the light value of the test lamp on the scale when the latter is viewed from the side opposite the comparison lamp.

12. A photometer having a movably mounted comparison lamp, a test lamp, a scale and an obstruction in the path of light from the comparison lamp to the scale mounted to travel with said comparison lamp, whereby the position of the comparison lamp may be indicated on said scale.

13. A photometer having an intergrating chamber, a door for the chamber, means for carrying a lamp on each side of the door, means for lighting the lamp inside of the chamber so that its illumination may be observed, and means for lighting the outside lamp whereby it will be preheated before being placed in the chamber.

14. A photometer having a light integrator, a test lamp within the integrator, a translucent window in the wall of the integrator, a chamber inclosing the window, a translucent glass in the chamber, an eye piece through which the light of the test lamp on the glass may be viewed, a comparison lamp movable toward and away from the eye piece, a diffusing glass between the comparison lamp and the eye piece, means for viewing the light of the comparison lamp on the diffusing glass through the eye piece, a translucent plate carrying a plurality of scales to indicate different light values, means whereby the comparison lamp will illuminate the scales, a slide movable relatively to the window and between the same and the eye piece, said slide having openings for varying the color and intensity of the light of the test lamp, a cam carried by the slide, a screen carried by and movable relatively to the cam, said screen being located between the comparison lamp and the plate, there being an opening in the screen for disclosing a single scale whereby movement of the slide will automatically operate the screen so that the comparison lamp will illuminate the scale corresponding to the opening opposite the eye piece, there being means carried by the comparison lamp for indicating the light value of the test lamp on the scale when the latter is viewed from the side opposite the comparison lamp.

15. A photometer having a light integrator, a test lamp within the integrator, a translucent window in the wall of the integrator, a chamber inclosing the window, a translucent glass in the chamber, an eye piece through which the light of the test lamp on the glass may be viewed, a comparison lamp movable toward and away from the eye piece, a diffusing glass between the comparison lamp and the eye piece, means for viewing the light of the comparison lamp on the diffusing glass through the eye piece, a plurality of scales to indicate different light values, means whereby the comparison lamp will illuminate the scales, a slide movable relatively to the window and between the same and the eye piece, said slide having means for varying the color and intensity of the light of the test lamp, a cam carried by the slide, a screen carried by and movable relatively to the cam, said screen being located between the comparison lamp and the plate, there being an opening in the screen for disclosing a single scale whereby movement of the slide will automatically operate the screen so that the comparison lamp will illuminate the scale corresponding to the opening opposite the eye piece, there being means carried by the comparison lamp for indicating the light value of the test lamp on the scale when the latter is viewed from the side opposite the comparison lamp.

This specification signed and witnessed this 7th day of July, 1917.

WILLIAM F. LITTLE.
    CLAYTON H. SHARP.

Witnesses:
 M. BROWN,
 C. E. SLOCUM.